US011836643B2

United States Patent
Sharad et al.

(10) Patent No.: US 11,836,643 B2
(45) Date of Patent: Dec. 5, 2023

(54) SYSTEM FOR SECURE FEDERATED LEARNING

(71) Applicant: NEC Laboratories Europe GmbH, Heidelberg (DE)

(72) Inventors: Kumar Sharad, Heidelberg (DE); Ghassan Karame, Heidelberg (DE); Giorgia Azzurra Marson, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 614 days.

(21) Appl. No.: 16/296,380

(22) Filed: Mar. 8, 2019

(65) Prior Publication Data

US 2020/0285980 A1 Sep. 10, 2020

(51) Int. Cl.
*G06N 3/098* (2023.01)
*G06N 5/043* (2023.01)
*G06N 20/20* (2019.01)
*G06F 21/60* (2013.01)

(52) U.S. Cl.
CPC ........... *G06N 5/043* (2013.01); *G06F 21/606* (2013.01); *G06N 3/098* (2023.01); *G06N 20/20* (2019.01)

(58) Field of Classification Search
CPC ....... G06N 5/043; G06N 20/20; G06F 21/606
See application file for complete search history.

(56) References Cited

U.S. PATENT DOCUMENTS

2020/0167471 A1* 5/2020 Rouhani .................. G06N 7/01
2021/0166157 A1* 6/2021 Bhowmick ............. G06N 20/20

OTHER PUBLICATIONS

Bhowmick et al., U.S. Appl. No. 62/774,126 Specification, Provisional for US 2021/0166157, filed Nov. 2018. (Year: 2018).*
Bhowmick et al., U.S. Appl. No. 62/774,227 Specification, Provisional for US 2021/0166157, filed Dec. 2018. (Year: 2018).*

(Continued)

*Primary Examiner* — Marshall L Werner
(74) *Attorney, Agent, or Firm* — Leydig, Voit & Mayer, Ltd.

(57) ABSTRACT

A method for performing federated learning includes initializing, by a server, a global model $G^0$. The server shares $G^0$ with a plurality of participants (N) using a secure communications channel. The server selects n out of N participants, according to filtering criteria, to contribute training for a round r. The server partitions the selected participants n into s groups and informs each participant about the other participants belonging to the same group. The server obtains aggregated group updates $AU^1, \ldots, AU^g$ from each group and compares the aggregated group updates and identifies suspicious aggregated group updates. The server combines the aggregated group updates by excluding the updates identified as suspicious, to obtain an aggregated update $U^{final}$. The server derives a new global model $G^r$ from the previous model $G^{r-1}$ and the aggregated update $U^{final}$ and shares $G^r$ with the plurality of participants.

11 Claims, 6 Drawing Sheets

(56) References Cited

OTHER PUBLICATIONS

Bonawitz et al., Practical Secure Aggregation for Privacy-Preserving Machine Learning, CCS '17, pp. 1175-1191, Oct. 2017. (Year: 2017).*

Fung et al., Mitigating Sybils in Federated Learning Poisoning, Feb. 2019. (Year: 2019).*

Konecny, et al, "Federated Optimization: Distributed Machine Learning for On-Device Intelligence," *s.l.: CoRR*: 1-38 (Oct. 11, 2016).

Bonawitz, et al, "Practical Secure Aggregation for Privacy-Preserving Machine Learning," *ACM SIGSAC Conference on Computer and Communications Security*: 1175-1191 (Dec. 2017).

Chen, et al., "Draco Robust Distributed Training against Adversaries," *SysML*: 18 (Feb. 18, 2018).

Fung, et al., "Mitigating Sybils in Federated Learning Poisoning," N/A: 1-16 (Nov. 28, 2018).

Fung, et al., "Dancing in the Dark: Private Multi-Party Machine Learning in an Untrusted Setting," N/A: 1-16 (Nov. 23, 2018).

* cited by examiner

SYSTEM FOR SECURE FEDERATED LEARNING

FIELD

The present invention relates to methods and systems for secure federated learning in a machine learning model.

BACKGROUND

Machine learning (ML) has gradually made its way into many day-to-day applications. Due to the widespread use of machine-learning technologies, deployed machine learning models are often extensively trained. Training allows machine learning systems to provide accurate results on a diverse set of inputs. In particular, a large and variegated training dataset is needed to obtain an accurate and versatile model for the machine learning system.

Machine learning algorithms typically rely on training data being directly and centrally accessible. Therefore, the entity which effectively operates the model training has access to every training sample. Therefore, most machine learning as a service application which benefit from user's own data (to enrich the training dataset) explicitly demands users to reveal/expose their data. This produces an inherent tension between functionality and privacy. That is, to benefit from the advantages of machine learning technologies, one must potentially compromise their privacy by sharing private data.

Systems that attempt to federate the machine learning process by letting the training process be performed in a distributed manner, without the need of centralizing private data suffer from numerous potential security and privacy issues.

SUMMARY

In an embodiment, a method for performing federated learning is provided. The method includes initializing, by a server, a global model $G^0$. The server shares $G^0$ with a plurality of participants (N) using a secure communications channel. The server selects n out of N participants, according to filtering criteria, to contribute training for a round r. The server partitions the selected participants n into s groups and informs each participant about the other participants belonging to the same group. The server obtains aggregated group updates $AU^1, \ldots, AU^g$ from each group and compares the aggregated group updates and identifies suspicious aggregated group updates. The server combines the aggregated group updates by excluding the updates identified as suspicious, to obtain an aggregated update $U^{final}$. The server derives a new global model $G^r$ from the previous model $G^{r-1}$ and the aggregated update $U^{final}$ and shares $G^r$ with the plurality of participants.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
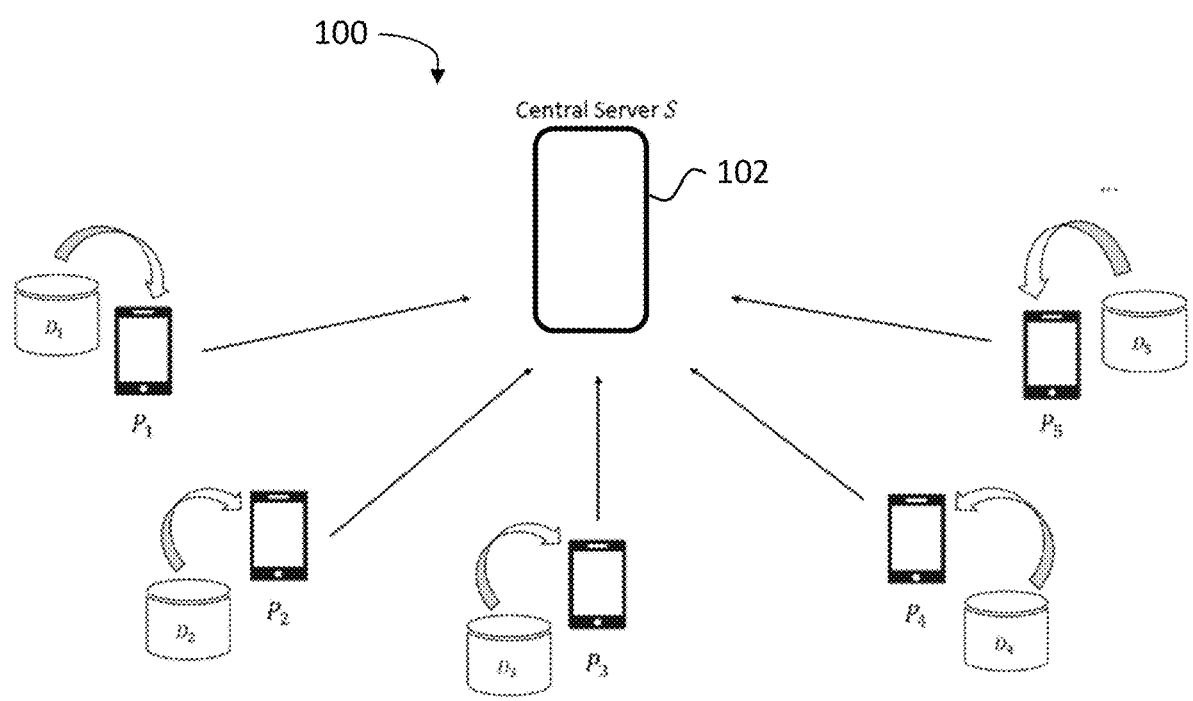
FIG. 1 illustrates a system diagram of an environment for performing a federated learning process according to an embodiment.

A problem unique to computer systems, and machine learning systems in particular, and solved by embodiments of the present invention is to provide security and privacy to participants in a machine learning system. Embodiments provide a federated learning (FL) system. The federated learning system is a collaborative machine learning method which alleviates privacy and security concerns by performing the machine learning training process in a distributed manner, without the need of centralizing private data. In some embodiments federated learning may run on tens of millions of clients that are coordinated by a central entity. The federated learning system trains a model through a distributed protocol, run among the clients and the central entity. The system lets each client submit their contribution in a privacy-preserving manner, thus doing away with the need to collect data centrally. In this way, security and privacy are improved in the computer, machine learning system.

In an embodiment, the invention provides a method that improves security and privacy in a federated learning system. More specifically, a federated learning protocol generates a global model (G) throughout several rounds of training. In a round (r), the central entity randomly selects a subset of clients to contribute that round. Each of these clients is expected to derive a local model (L) by training the current global model $G^\wedge(r-1)$ with their own training data. Hence, the selected clients send updates to the central server for improving the global model based on their local data. These updates are then aggregated to derive a new global model $(G^\wedge r)$ for the next round. In an example implementation, an entity can coordinate the training of millions of mobile phones, and then aggregating their locally trained models in a centralized fashion.

The federated learning system preserves the data privacy of users contributing the training process. In addition to limiting or preventing leakage of private data, the system may account for the presence of possibly malicious clients, so-called "sybils", which may try to subvert the trained model. In fact, the distributed nature of federated learning exposes the system to sybils which may deviate from the protocol to their benefit, and which are difficult to detect due to the lack of accountability in the system.

It is a challenge to secure a distributed system like a federated learning system due to several competing goals. Since the system aims to be open (to benefit as much as possible from variegated data) while doing it at scale, the participants are generally not vetted. Being privacy friendly also precludes auditing of participants and building a history of their updates. These requirements make it difficult to validate the computations of the participants and thus limit the damage done by rogue nodes.

Embodiments of the invention provide a novel security mechanism to protect federated learning against malicious participants (sybils) who attempt to subvert the global model by submitting specially crafted updates. Embodiments provide protection to the server and honest participants against sybils and can be combined with existing security systems.

In an embodiment, the present invention provides a method for performing federated learning, comprising: initializing, by a server, a global model G^0; sharing, by the server, G^0 with a plurality of participants (N) using a secure communications channel; selecting, by the server, n out of N participants, according to filtering criteria, to contribute training for a round r; partitioning, by the server, the selected participants n into s groups; informing, by the server, each participant about the other participants belonging to the same group; obtaining, by the server, aggregated group updates AU^1, ..., AU^g from each group; comparing, by the server, the aggregated group updates and identifying suspicious aggregated group updates; combining, by the server, the aggregated group updates by excluding the updates identified as suspicious, to obtain an aggregated update U^final; deriving, by the server, a new global model G^r from the previous model G^(r-1) and the aggregated update U^final; and sharing, by the server, G^r with the plurality of participants.

In the same or other embodiment, the aggregated group updates are obtained from a locally trained model L_i using local training data by each participant; relevant updates U_i needed to obtain a local model L_i from the previous global model G^(r-1) are generated by each participant; and all participants belonging to the same group k∈{1, ..., g}, execute a secure aggregation protocol to combine all of their updates U_1^k, ..., U_s^k, to obtain an aggregated group update AU^k.

In the same or other embodiment, further comprising: locally training, by each participant, a model L_i using local training data; generating, by each participant, relevant updates U_i needed to obtain a local model L_i from the previous global model G^(r-1); and running, by all participants belonging to the same group k∈{1, ..., g}, a secure aggregation protocol to combine all of their updates U_1^k, ..., U_s^k, to obtain an aggregated group update AU^k.

In the same or other embodiment, identifying suspicious aggregated group updates is performed using a machine learning algorithm.

In the same or other embodiment, the plurality of participants is greater than 10,000.

In the same or other embodiment, the secure communications channel is a pairwise secure channel.

In the same or other embodiment, all communication between the server and a participant is authenticated and confidential.

In the same or other embodiment, the s groups contain differing numbers of participants.

In the same or other embodiment, identifying suspicious aggregated group updates is performed deterministically.

In the same or other embodiment, further comprising aggregating the received updates by averaging all contributions.

In an embodiment, the present invention provides a server comprising one or more processors which, alone or in combination, are configured to provide for performance of the following steps: initializing a global model G^0; sharing G^0 with a plurality of participants (N) using a secure communications channel; selecting n out of N participants, according to filtering criteria, to contribute training for a round r; partitioning the selected participants n into s groups; informing each participant about the other participants belonging to the same group; obtaining aggregated group updates AU^1, ..., AU^g from each group; comparing the aggregated group updates and identifying suspicious aggregated group updates; combining the aggregated group updates by excluding the updates identified as suspicious, to obtain an aggregated update U^final; deriving a new global model G^r from the previous model G^(r-1) and the aggregated update U^final; and sharing G^r with the plurality of participants.

In the same or other embodiment, the aggregated group updates are obtained from a locally trained model L_i using local training data by each participant; relevant updates U_i needed to obtain a local model L_i from the previous global model G^(r-1) are generated by each participant; and all participants belonging to the same group k∈{1, ..., g}, execute a secure aggregation protocol to combine all of their updates U_1^k, ..., U_s^k, to obtain an aggregated group update AU^k.

In an embodiment, the present invention provides a non-transitory computer readable medium storing instructions that when executed by a processor cause the following steps to be performed: initializing a global model G^0; sharing G^0 with a plurality of participants (N) using a secure communications channel; selecting n out of N participants, according to filtering criteria, to contribute training for a round r; partitioning the selected participants n into s groups; informing each participant about the other participants belonging to the same group; obtaining aggregated group updates AU^1, ..., AU^g from each group; comparing the aggregated group updates and identifying suspicious aggregated group updates; combining the aggregated group updates by excluding the updates identified as suspicious, to obtain an aggregated update U^final; deriving a new global model G^r from the previous model G^(r-1) and the aggregated update U^final; and sharing G^r with the plurality of participants.

In the same or other embodiment, the aggregated group updates are obtained from a locally trained model L_i using local training data by each participant; relevant updates U_i needed to obtain a local model L_i from the previous global model G^(r-1) are generated by each participant; and all participants belonging to the same group k∈{1, ..., g}, execute a secure aggregation protocol to combine all of their updates U_1^k, ..., U_s^k, to obtain an aggregated group update AU^k.

In the same or other embodiment, the secure communications channel is a pairwise secure channel.

FIG. 1 illustrates a system diagram of an environment for performing a federated learning process according to an embodiment. Embodiments allow for the detection of malicious participants based on the updates they submit in each round of a federated learning system. To preserve the privacy of participants, a server cannot access each participant-specific update, but only an obfuscated version of it. The server is given a number of aggregated updates obtained by combining the contributions of carefully-sized groups of participants, so that no private information is provided about any specific participant. However, the system allows malicious contributions to be detected.

The federated learning system 100 includes a central server (S) 102 and a number (N) of participants $P_1, \ldots, P_N$ (clients). N can be any number. Examples include 1,000, 10,000, 1 million and so on. The goal of the federated learning process is to train a "global" machine learning (ML) model G for classification. G should assign to samples x∈X the correct label y∈Y, using as a training set the union of private datasets $D_i$, for i=1, ..., N, provided by the various participants $P_1, ..., P_N$.

To initialize the federated learning system, each of the various participants $P_1, ..., P_N$ engages with the server S 102 in a (two-party) authenticated key exchange protocol, and establishes a pairwise secure channels with the server S. Therefore, all messages exchanged among the server S and any of the participants $P_1, ..., P_N$ are authenticated and confidential. Further, the server S prepares a global model G^0 and makes the model available to all participants.

Figure 2:
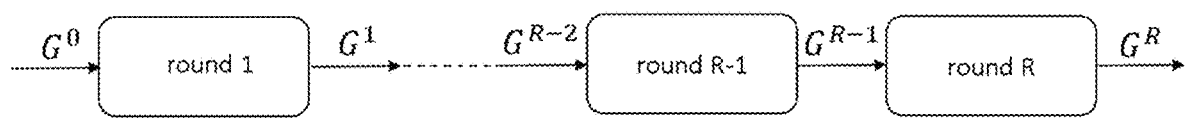
FIG. 2 illustrates a process for performing federated learning iterations according to an embodiment.
Figure 3:
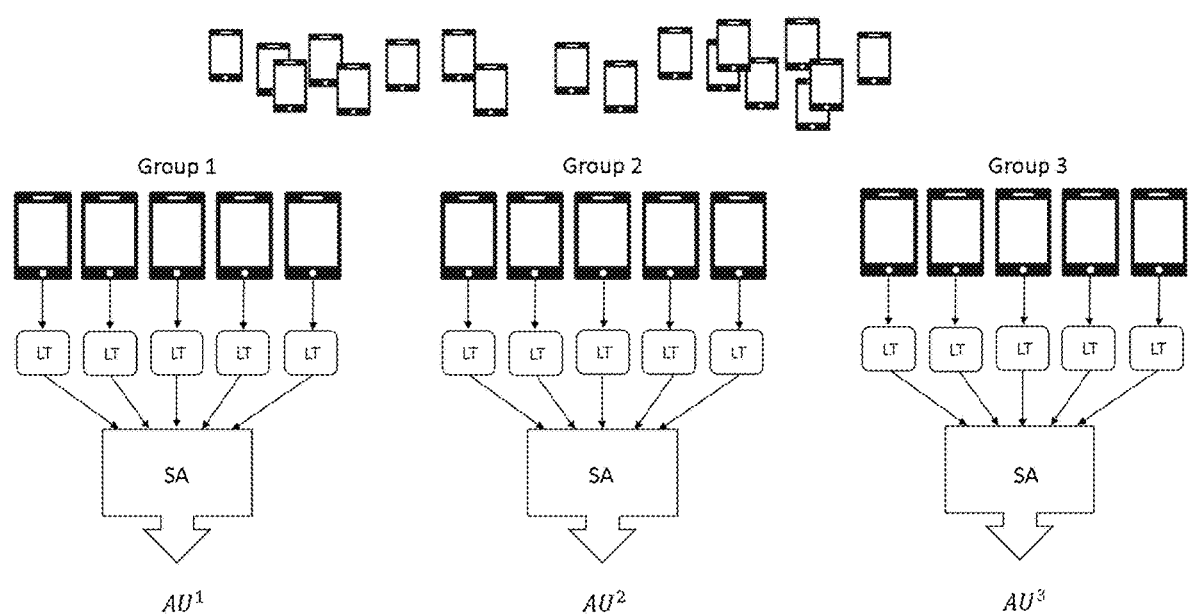
FIG. 3 illustrates a federated learning system including grouping, local training and secure aggregation according to an embodiment.

FIG. 3 illustrates a process for performing federated learning iterations according to an embodiment. The training process consists of a number of rounds R, as illustrated in FIG. 2. After initialization, the global model is continuously updated with the local contributions of the participants, generating for each round r=1, ..., R an intermediate model $G^r$. The final model $G'=G^R$ coincides with the global model obtained upon completion of the last round.

The various operations and protocol steps to be executed in a generic round of the federated learning process are explained below. Let $G=G^{r-1}$ be the "current" global model prior to entering round r, and let $G'=G^r$ denote the updated global model upon completion of the considered round. The mechanism to update G into G' is explained below.

FIG. 3 illustrates a federated learning system including grouping, local training and secure aggregation according to an embodiment. The system first performs group selection. After publishing the current model G, the server randomly selects n contributors among the participants, and further partitions them into g groups (or subsets). Each group is denoted by $\{P_1^k, ..., P_s^k\}$, for k∈{1, ..., g}, where s is the size of the group and the placeholders $P_1^k, ..., P_s^k$ identify the selected contributors for the k-th group, i.e., $P_i^k \in \{P_1, ..., P_N\}$ for every group k∈{1, ..., g} and every i∈{1, ..., s} (note that group sizes may vary; s is used as a placeholder here).

Next, the system performs local training (LT). Each of the selected contributors $P_i$ retrieves the current global model G, and proceeds with training a local model $L_i$ starting from G and using their own dataset $D_i$. Let $d_i=|D_i|$ be the number of labeled samples (x, y) contained in $D_i$. Finally, the contributor prepares the model updates $U_i$, which may include the size $d_i$ of the used training set, to turn model G into $L_i$. The updates $\{U_i\}_{i=1,...,n}$ constitute the input data of contributors for the next step.

The system next performs group specific secure aggregation (SA). The contributors of each group $\{P_1^k, ..., P_s^k\}$ run a secure aggregation protocol, possibly with the support of the server S, to combine their local updates in a privacy-preserving manner. Upon completion of this step, the server obtains the aggregated group-updates $AU^1, ..., AU^g$ resulting from combining the updates $\{U_1^k, ..., U_s^k\}$ of the group members, for each group k∈{1, ..., g}.

Figure 4:
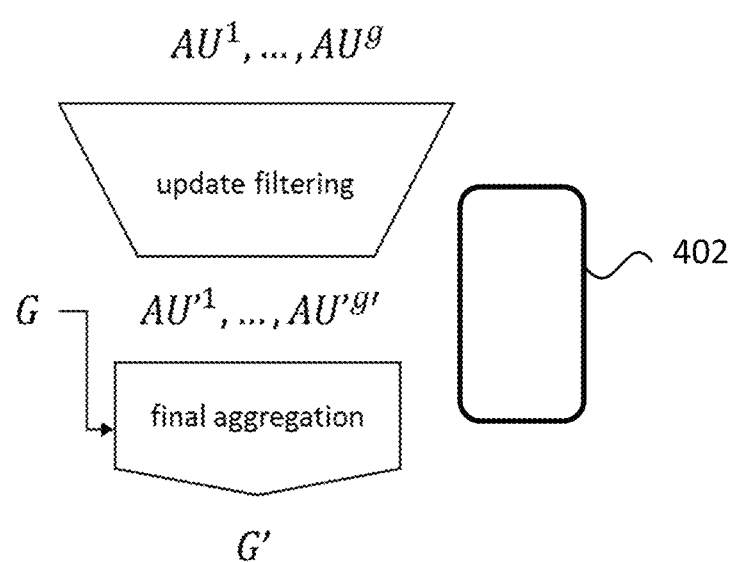
FIG. 4 illustrates update filtering and final aggregation in a federated learning system according to an embodiment.

FIG. 4 illustrates update filtering and final aggregation in a federated learning system according to an embodiment. The system filters suspicious updates. The server S 402 makes a prediction about which ones of the aggregated updates $AU^1, ..., AU^g$ have been submitted by malicious contributors. To this end, S compares the aggregated updates $AU^1, ..., AU^g$ and flags the "outliers", namely the updates which appear to be significantly distant from the rest. In one embodiment, the identification step may be done deterministically, via direct comparison of the updates. In another embodiment, the identification step may be done probabilistically using, for example, machine learning techniques.

Upon completion of this procedure, the server is left with a subset of aggregated updates $\{AU'^1, ..., AU'^{g'}\} \subset \{AU^1, ..., AU^g\}$(g'≤g), for which the server has a higher level of confidence were not submitted by a malicious actor.

Next, the system performs final aggregation. The server combines the group updates $AU'^1, ..., AU'^{g'}$ that survived the filtering step with the previous global model G. The system therefore obtains an updated global model G'.

In one embodiment, the global model G is a deep-learning (DL) model, and can thus be represented through a function G:X×V→Y, y:=G(x, v), where v is a high-dimensional vector which parametrizes the function.

The local training, performed by each selected participant $P_i$ given a description of the current model <G>=v, consists in finding a new parameter-vector v' which minimizes the loss function associated to the DL model. In this case, the model updates $U_i$ derived by $P_i$ can be described as a vector $u_i = v'_i - v_i$, namely the differences between "current" and "previous" parameter-vector. In every round, vectors $v'_i$ are meant to be an improvement of the previous model parameter v.

Updates are aggregated in a privacy-preserving manner. The secure aggregation protocol may be used within each group. Let $AU^k = u^k$, for k=1, ..., g, denote the updated parameter-vector obtained by aggregating all contributions of the participants belonging to the k-th group.

Upon receiving aggregated updates $\{u^1, ..., u^g\}$ from each group, the server identifies possibly malicious updates by comparing the vectors $u^k$ directly, or by training a (local) classifier C to discern "regular" updates from "suspicious" ones.

Finally, the server may aggregate the received updates by averaging all contributions, making sure to assign a low weight (possibly zero) to the vectors u* that were identified as suspicious, and adding the resulting aggregated update $u^{final}$ to the previous parameter-vector v to obtain the new parameter $v' = v + u^{final}$.

Secure federated Learning has a number of applications in security critical scenarios. For example, federated learning may be used to collaboratively train a shared prediction model by mobile devices without sharing their private data. The model makes predictions to complete sentences typed by users. In this scenario a malicious device may try to poison the model such that a chosen business or restaurant is suggested when someone searches for food in a particular street. For instance, "best burger in 5th Avenue ..." can be completed by inputting a chosen business, rather than the business with the best burger. In such a scenario it is important to make the model robust for people to trust it.

In another example, an application may be classifying apps as benign or malicious. A back doored model can let carefully designed apps through despite being malicious. Hence, robustness plays a critical role here as well. Additionally, machine learning based facial recognition is widely used these days in consumer devices for authentication. Poisoning such models can allow the adversary to take over devices.

Figure 5:
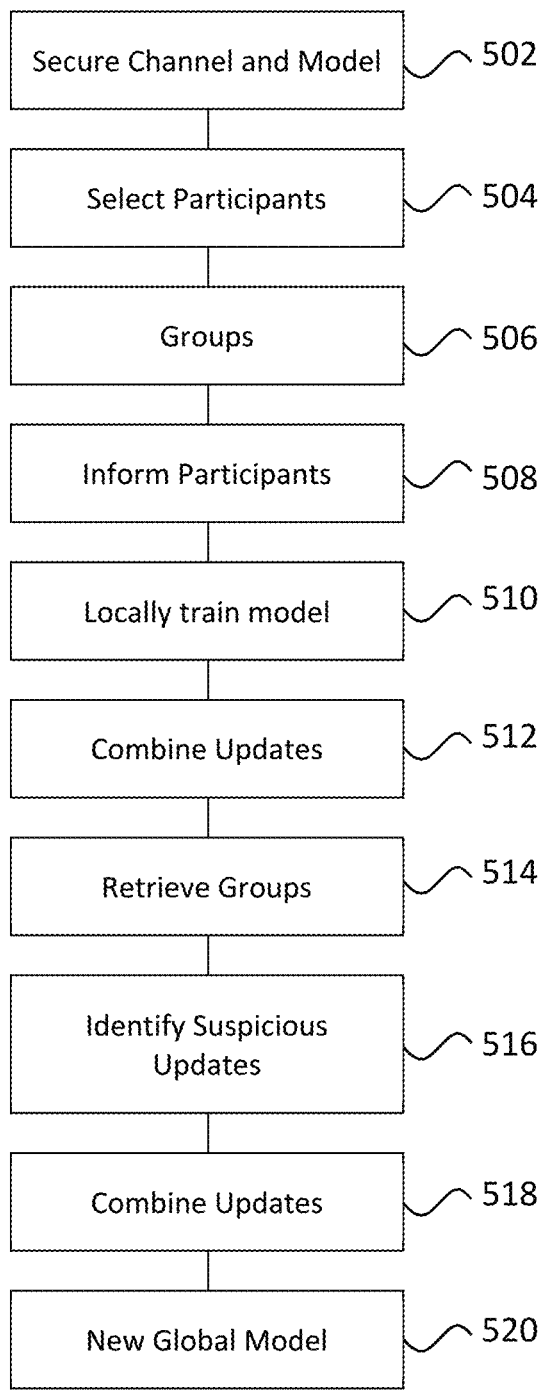
FIG. 5 is a flow diagram illustrating a process for performing federated learning according to an embodiment.

FIG. 5 is a flow diagram illustrating a process for performing federated learning according to an embodiment. At step 502, each participant establishes a secure channel with the central server and the server initializes a global model $G^0$ and shares it with all participants. At step 504, The server selects n out of N participants, according to some filtering criteria, to contribute the training for round r. At step 506 the server partitions the selected contributors into s groups. At step 508, the server informs each contributor about the other participants belonging to the same group. Next, at step 510, each contributor locally trains a model $L_i$ using their training data, and generates the relevant updates $U_i$ needed to obtain model $L_i$ from the previous model $G^{r-1}$. At step 512, all contributors belonging to the same group k=1, . . . , g, possibly together with the server, run a secure aggregation protocol to combine all of their updates $U_1^k, \ldots, U_s^k$, obtaining an aggregated group update $AU^k$. At step 514, the server retrieves all aggregated group updates $AU^1, \ldots, AU^g$. At step 516, the server compares the aggregated updates and identifies the suspicious ones via machine learning methods. Next, at step 518 the server combines the aggregated group updates by excluding, or reducing the impact of, the updates identified as suspicious, obtaining an aggregated update $U^{final}$. At step 520, the server derives a new global model $G^r$ from the previous model $G^{r-1}$ and the aggregated update $U^{final}$, and shares $G^r$ with all participants.

Figure 6:
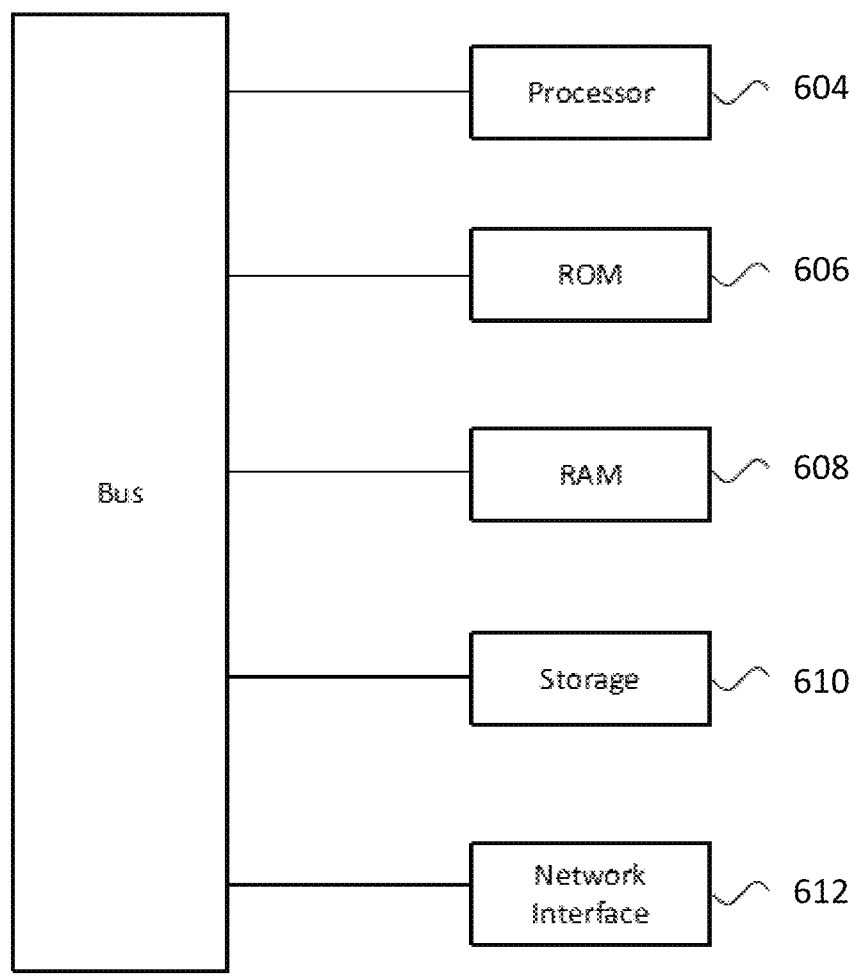
FIG. 6 is a block diagram of a processing system according to an embodiment.

FIG. 6 is a block diagram of a processing system according to an embodiment. The processing system can be used by the server, participants or other computerized systems to implement the methods and systems described herein. The processing system includes a processor 604, such as a central processing unit (CPU), executes computer executable instructions comprising embodiments of the system for performing the functions and methods described above. In embodiments, the computer executable instructions are locally stored and accessed from a non-transitory computer readable medium, such as storage 610, which may be a hard drive or flash drive. Read Only Memory (ROM) 606 includes computer executable instructions for initializing the processor 604, while the random-access memory (RAM) 608 is the main memory for loading and processing instructions executed by the processor 604. The network interface 612 may connect to a wired network or cellular network and to a local area network or wide area network, such as the internet. Further, the network interface 612 may include a transmitter and a receiver to implement Optical-Wireless-Communication links as described above.

All references, including publications, patent applications, and patents, cited herein are hereby incorporated by reference to the same extent as if each reference were individually and specifically indicated to be incorporated by reference and were set forth in its entirety herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing federated learning, comprising:
    initializing, by a server, a global model $G^0$;
    sharing, by the server, $G^0$ with a plurality of participants (N) using a secure communications channel;
    selecting, by the server, n out of N participants, according to filtering criteria, to contribute training for a round r;
    partitioning, by the server, the selected participants n into s groups;
    informing, by the server, each participant about the other participants belonging to the same group;
    obtaining, by the server, aggregated group updates $AU^1, \ldots, AU^g$ from each group for the round r, wherein, each participant locally uses local training data to generate a local update $U_i$ needed to obtain a local model $L_i$ from the previous global model $G^{r-1}$ and wherein each participant belonging to the same group k=1, . . . , g, executes a secure aggregation protocol to combine all of their updates $U_1^k, \ldots, U_s^k$, to obtain the aggregated group update $AU^g$, wherein the local update $U_i$ includes the size $d_i$ of the local training data;
    comparing, by the server, the aggregated group updates and identifying suspicious aggregated group updates probabilistically using machine learning for the round r;
    combining, by the server, the aggregated group updates by assigning a weight to each group update $AU^1, \ldots, AU^g$, averaging the weighted group updates to obtain an aggregated update $U^{final}$ and adding the aggregated update to a previous parameter vector, wherein the weight assigned to suspicious aggregated group updates is lower than the weight assigned to group updates that are not suspicious;
    deriving, by the server, a new global model $G^r$ from the previous model $G^{r-1}$ and the aggregated update $U^{final}$; and
    sharing, by the server, $G^r$ with the plurality of participants.

2. The method of claim 1, further comprising:
    locally training, by each participant, a model $L_i$ using local training data;
    generating, by each participant, updates $U_i$ needed to obtain a local model $L_i$ from the previous global model $G^{r-1}$; and
    running, by all participants belonging to the same group k∈{1, . . . , g}, a secure aggregation protocol to combine all of their updates $U_1^k, \ldots, U_s^k$, to obtain an aggregated group update $AU^k$.

3. The method according to claim 1, wherein the plurality of participants is greater than 10,000.

4. The method according to claim 1, wherein the secure communications channel is a pairwise secure channel.

5. The method according to claim 1, wherein all communication between the server and a participant is authenticated and confidential.

6. The method according to claim 1, wherein the s groups contain differing numbers of participants.

7. The method according to claim 1, wherein identifying suspicious aggregated group updates is performed deterministically.

8. The method according to claim 1, further comprising aggregating the received updates by averaging all contributions.

9. A server comprising one or more processors which, alone or in combination, are configured to provide for performance of the following steps:
  initializing a global model $G^0$;
  sharing $G^0$ with a plurality of participants (N) using a secure communications channel;
  selecting n out of N participants, according to filtering criteria, to contribute training for a round r;
  partitioning the selected participants n into s groups;
  informing each participant about the other participants belonging to the same group;
  obtaining aggregated group updates $AU^1, \ldots, AU^g$ from each group for the round r, wherein, each participant locally uses local training data to generate a local update $U_i$ needed to obtain a local model $L_i$ from the previous global model $G^{r-1}$ and wherein each participant belonging to the same group $k=1, \ldots, g$, executes a secure aggregation protocol to combine all of their updates $U_1^k, \ldots, U_s^k$, to obtain the aggregated group update $AU^g$, wherein the local update $U_i$ includes the size $d_i$ of the local training data;
  comparing the aggregated group updates and identifying suspicious aggregated group updates probabilistically using machine learning for the round r;
  combining the aggregated group updates by assigning a weight to each group update $AU^1, \ldots, AU^g$, averaging the weighted group updates to obtain an aggregated update $U^{final}$ and adding the aggregated update to a previous parameter vector, wherein the weight assigned to suspicious aggregated group updates is lower than the weight assigned to group updates that are not suspicious;
  deriving a new global model $G^r$ from the previous model $G^{r-1}$ and the aggregated update $U^{final}$; and
  sharing $G^r$ with the plurality of participants.

10. A non-transitory computer readable medium storing instructions that when executed by a processor cause the following steps to be performed:
  initializing a global model $G^0$;
  sharing $G^0$ with a plurality of participants (N) using a secure communications channel;
  selecting n out of N participants, according to filtering criteria, to contribute training for a round r;
  partitioning the selected participants n into s groups;
  informing each participant about the other participants belonging to the same group;
  obtaining aggregated group updates $AU^1, \ldots, AU^g$ from each group for the round r, wherein, each participant locally uses local training data to generate a local update $U_i$ needed to obtain a local model $L_i$ from the previous global model $G^{r-1}$ and wherein each participant belonging to the same group $k=1, \ldots, g$, executes a secure aggregation protocol to combine all of their updates $U_1^k, \ldots, U_s^k$, to obtain the aggregated group update $AU^g$, wherein the local update $U_i$ includes the size $d_i$ of the local training data;
  comparing the aggregated group updates and identifying suspicious aggregated group updates probabilistically using machine learning for the round r;
  combining the aggregated group updates by assigning a weight to each group update $AU^1, \ldots, AU^g$, averaging the weighted group updates to obtain an aggregated update $U^{final}$ and adding the aggregated update to a previous parameter vector, wherein the weight assigned to suspicious aggregated group updates is lower than the weight assigned to group updates that are not suspicious;
  deriving a new global model $G^r$ from the previous model $G^{r-1}$ and the aggregated update $U^{final}$; and
  sharing $G^r$ with the plurality of participants.

11. The computer readable medium according to claim 10, wherein the secure communications channel is a pairwise secure channel.

* * * * *